United States Patent Office 3,745,024
Patented July 10, 1973

3,745,024
METHOD AND APPARATUS FOR FILLING AND SEALING FLEXIBLE CONTAINERS
Andrew George Ford, Hitchin, and Ronald Augustus Hudson, Welwyn Garden City, England, assignors to Imperial Chemical Industries, Limited, London, England
Continuation-in-part of application Ser. No. 60,559, Aug. 3, 1970, which is a division of application Ser. No. 797,883, Feb. 10, 1969, now abandoned. This application July 12, 1972, Ser. No. 271,208
Claims priority, application Great Britain, Feb. 29, 1968, 9,849/68; June 14, 1968, 28,360/68
Int. Cl. B65b 31/06
U.S. Cl. 99—171 B  11 Claims

ABSTRACT OF THE DISCLOSURE

A plastics film container is pressurised through an aperture in its wall while held in gas-tight contact with a continuous surface, and the inflated container is slid upon the surface to bring the aperture into contact with a sealing strip, which is sealed around the aperture.

---

This application is a continuation-in-part application of our application Ser. No. 60,559, filed Aug. 3, 1970, now abandoned, which is itself a divisional application of our application Ser. No. 797,883, filed Feb. 10, 1969, and now abandoned.

The invention relates to the sealing of flexible plastics containers with contents under superatmospheric pressure.

The invention relates particularly to the filling and sealing of flexible plastics containers containing liquids under pressure, including liquids containing dissolved gases, such as beer and carbonated soft drinks and liquids which are packed under pressure of a gas that is not soluble in the liquid, to give substantially rigid packs. It may be applied also to the packaging of solid articles, the pack being pressurized to make it rigid, usually for the purpose of protecting the contents or to improve the sale appeal of the pack, and to the packaging of particulate solids. The invention includes the filing of the container with gas under superatmospheric pressure only.

The present invention provides a method of filling and sealing a flexible plastics container, closed by gas-tight seals except at a filling aperture in its wall, to produce a package having contents at superatmospheric pressure, which comprises: placing the container against a smooth surface with said aperture located over an orifice in said surface, said orifice being connected to a source of gas at superatmospheric pressure and said surface being of such smoothness that the aperture may be sealed thereby against the substantial escape of gas when the container is inflated and held with its apertured wall pressed against said surface; inflating the container by the introduction of gas through said orifice from said source of gas; and while holding the inflated container with said aperture in substantially gas-tight juxtaposition to said surface, sliding the container along, against and relative to said surface, to bring that portion of the wall of the container which surrounds said aperture into contact with a supported flexible sealing strip held in substantially continuous relationship to said surface; and sealing the sealing strip to the wall of the container around said aperture.

In the term "over an orifice" we include any case where the container is located so that the aperture covers the orifice, irrespective of whether the surface containing the orifice is generally located above, beneath or beside the container. By the expression "closed container" we mean that the container is gas-tight, in respect of the pressure of gas to be reached within the container, except at the aperture provided for pressurising the container and at any further aperture in the wall of the container that may be held in gas-tight contact with a surface and sealed in similar manner to the aperture described. By the term "fully inflated" we mean that the pressure inside the container is at least sufficient to allow the container to be held in substantially gas-tight contact with the surface.

When the container is to be filled with a liquid or particulate solid, this is preferably introduced through the aperture after the container has been inflated with a gas. It may be introduced through the same orifice as the gas, or through a closely adjacent second orifice that is also covered by the aperture in the container, or through a second orifice spaced from the first orifice, to which the inflated container may be slid after it has been pressurised at the first orifice. When the package is to contain a solid article or articles, these are put into the container before it is closed, and the container is subsequently pressurised and sealed in the manner described.

The method of the invention is used with particular advantage in the packaging of beer and carbonated soft drinks in flexible plastics containers. The containers must of course be of sufficient strength, and have gas-tight seals sufficiently strong, to resist the internal pressure. One type of container that is particularly suitable for use in the method is formed from a length of flexible, seamless plastics tubing, the opposed inner surfaces at both ends being joined by a seal and each end being bunched together and tightly held by a band or ligature at least the inner end of which is located inwardly of the seal, and a filling aperture being provided in that part of the wall of the container which assumes a cylindrical form when the container is inflated. The seals in the ends of the container are preferably formed as flat seals before the ends are bunched. One preferred form of such a container is that described in our United States specification No. 3,620,774, each container being, however, closed at both ends in the manner described, and provided with a suitable filling aperture in the wall thereof. Thus, these containers are closed at each end by a bunched neck, with a ligature or other encircling closure applied to the bunched neck immediately blow a thickned region thereof that is of greater cross-sectional area than the region encompassed by the encircling closure, and all capillaries leading through the bunched neck from inside the container to the atmosphere are sealed against egress of gas from the container. The seal is preferably a heat-seal, but it may alternatively be formed by a layer of self-adhesive material coated on to one or both opposed surfaces of the container neck. Other types of plastics-film containers may however be used, provided that they meet the requirements specified hereinbefore.

The present invention further provides apparatus for filling and sealing a flexible plastics container comprising a smooth surface having therein an orifice; means for supplying and supporting a sealing strip in such manner that it may be drawn from its source of supply along a path substantially continuous with said surface and in line with but in a direction away from said orifice; means for supplying through said orifice a gas for inflating to superatmospheric pressure a plastics film container presented to said surface with a filling aperture in its wall located over said orifice; and a support for holding the container sufficiently under compression against said surface to maintain a substantially gas-tight seal around said aperture while the container is slid along said surface to bring said aperture into the path of said sealing strip, and until the sealing strip covers and surrounds said aperture.

The invention will now be more particularly described by way of example with reference to the accompanying drawings, of which FIGS. 1 to 3 illustrate a simple form of the apparatus of the invention, arranged for the containers to be placed in position by hand and moved by hand from the filling to the sealing position, and thence to the ejecting position, while FIGS. 4 and 5 illustrate an apparatus adapted for the containers to be mechanically placed in position and moved from one position to the next.

Figure 1:
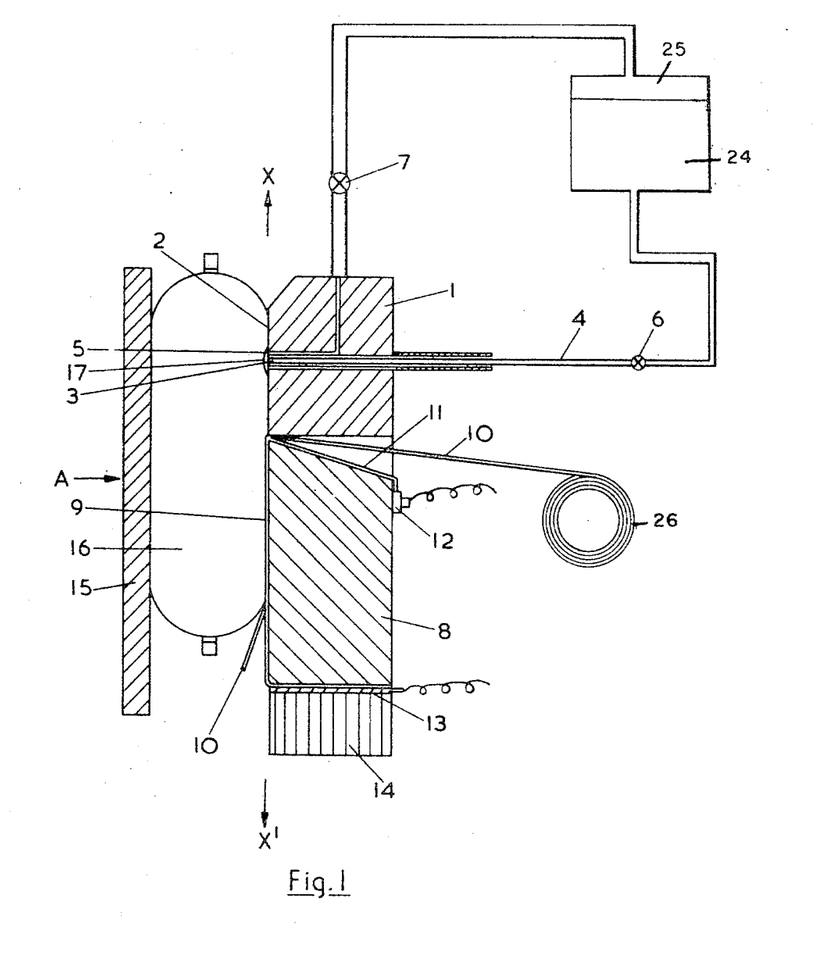
FIG. 1 is a diagrammatic elevation, seen from one side and partly in section, of the first filling and sealing apparatus.
Figure 3:
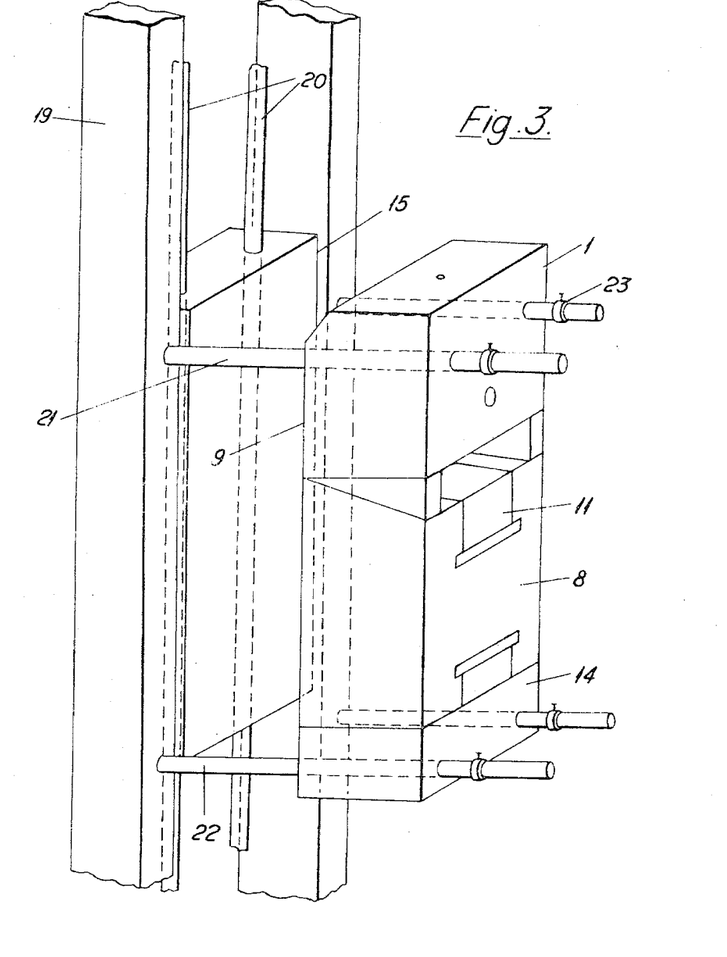
FIG. 3 is a diagrammatic elevation showing the mounting of the movable parts of the apparatus shown in FIG. 1.

Referring to FIGS. 1 and 3, 1 is a brass block provided with a smooth, flat front surface 2 in which are a first orifice 3 through which passes a retractable probe 4 which is connected to a reservoir of beer 24 stored under pressure of carbon dioxide, and a second orifice 5 connected to the carbon dioxide-filled space 25 above the beer in the reservoir. The beer reservoir is located at a higher level than the orifice 3 to provide a gravitational head. The orifices 3 and 5 are close together. The lines to orifices 3 and 5 are provided with valves 6 and 7, respectively. Below the brass block 1 is shown an impulse heat-sealing unit, the body 8 of which consists of an electrically insulating and heat resistant material, suitably of a hard, bonded asbestos block. The heat-sealing unit has a front face 9 contiguous with the front surface 2 of the brass block, except for a 0.005-inch gap provided to allow a continuous length of heat sealable tape 10 to be fed from roll 26 between the brass block 1 and the heat-sealing unit 8 to pass down the face of the latter. 11 is the heating element, suitably of 0.0005-inch thick stainless steel strip, connected at one end to a transformer at terminal 12 passing over and down the front face of the heat-sealer 8 and having its other end in close contact with a 0.125-inch thick brass strip 13 which is connected to the other terminal of the transformer and held between the heat-sealer 8 and a supporting block 14. The later is also made of electrically insulating material. The front face of the brass strip 13 is level both with the front face 9 of the heat-sealing unit and with the front face of the supporting block 14. A strip of glasscloth (not shown) impregnated with polytetrafluoroethylene covers the outer surface of the heat-sealing element, to provide a non-stick surface.

A plate 15 is provided, which may be formed of transparent material such as polymethyl methacrylate, and which is mounted in a support 19 (FIG. 3), and is slidable upon vertical guide rods 20 in a plane parallel with the front faces of the brass block 1 and heat-sealer 8. Horizontal rods 21 and 22 fixed to the support 19 carry the assembly comprising the block 1, heat-sealer 8, and supporting block 14, the assembly being slidably mounted with the rods passing through block 1 and supporting block 14. Adjustable stops 23 on the rods are provided to limit the gap between the plate 15 and front face 2 of block 1.

At 16 in FIG. 1 is shown a fully inflated plastics film container located in the apparatus. This container is formed from a length of oriented, tubular plastics film, provided with gas-tight, bunched seals at each end and with a pressurising and filling aperture which, when the container is in the pressurising and filling position, is located over the two orifices 3 and 5. For clarity of illustration this aperture is shown at 17; but the gap between the plate 15 and the faces of the brass block 1 and heat-sealing unit 8 is in fact adjusted so that, when the container is fully inflated, the surface of the container surrounding the apperture is pressed flat against the surface of the brass block 1 by the gas pressure.

Figure 2:
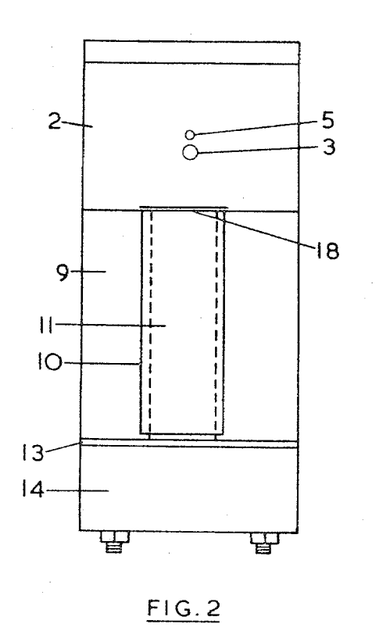
FIG. 2 is a view of a section through X, X' of FIG. 1, seen from the direction A.

In FIG. 2 are shown: the front face 2 of the brass plate 1; the orifices 3 and 5; the gap 18 through which the sealing tape 10 is fed; the position of the heating element 11 beneath the PTFE-impregnated glasscloth covering the front face 9 of the heat-sealing unit; the front edge of the brass strip 13; and the front face of the supporting block 14.

In operation, the empty, flat container is placed by hand between the sliding plate 15 and the main part of the apparatus (the latter being held initially somewhat apart from plate 15) with its longitudinal axis parallel to that of the apparatus, and located so that the filling aperture is opposite the two orifices, 3 and 5, use being made, as required, of the sliding movement of plate 15, to locate the aperture. The main part of the apparatus is then released and returns to its position against plate 15, with the container held between itself and the plate. The valve 7 is then opened, and the container is inflated and pressurised with the carbon dioxide, causing the plate 15 and the main part of the apparatus to separate to the stop position. The stops 23 will have been adjusted so that the gap between the sliding plate 15 and the front face of the block 1 is sufficiently less than the diameter of the container, when freely inflated to fully circular shape, for the wall of the container around the aperture to lie flat against the face 2 when the container is fully inflated in the apparatus. It has been found, surprisingly, that this provides a perfect seal, even against pressures as high as, or higher than, 30 p.s.i. With the container thus inflated, and with the valve 7 still open, the probe 4 is inserted into the container. The valve, 6, to the beer supply is then opened, and beer flows under its gravity head through the probe into the container, to fill it to the desired level. During the filling operation, the carbon dioxide is displaced back into the beer reservoir. The valve 6 is then closed. Because the pressure within the container is equal to the pressure above the beer supply, the beer does not froth. After valve 6 has been closed, the probe 4 is withdrawn into the supply tube. The filled container is then pulled by hand down through the apparatus, together with the length of sealing strip. until the aperture is brought into a position opposite the heat-sealing element, with the sealing strip and the polytetrafluoroethylene/glasscloth layer lying between it and the heat-sealing element. The heat-sealer is then brought into operation to seal the sealing strip around the aperture, and when the patch has cooled, the filled, sealed container is drawn through and out of the apparatus. The sealing strip is cut above the seal.

Figure 4:
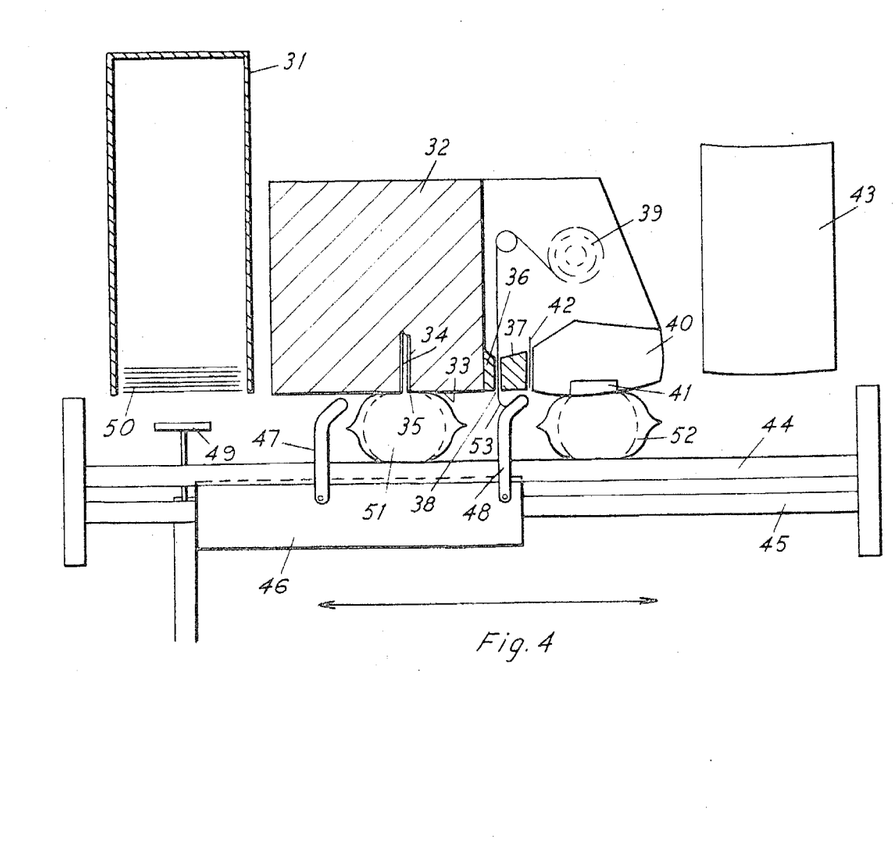
FIG. 4 is a side view, seen partly in section, of the mechanised filling and sealing apparatus.
Figure 5:
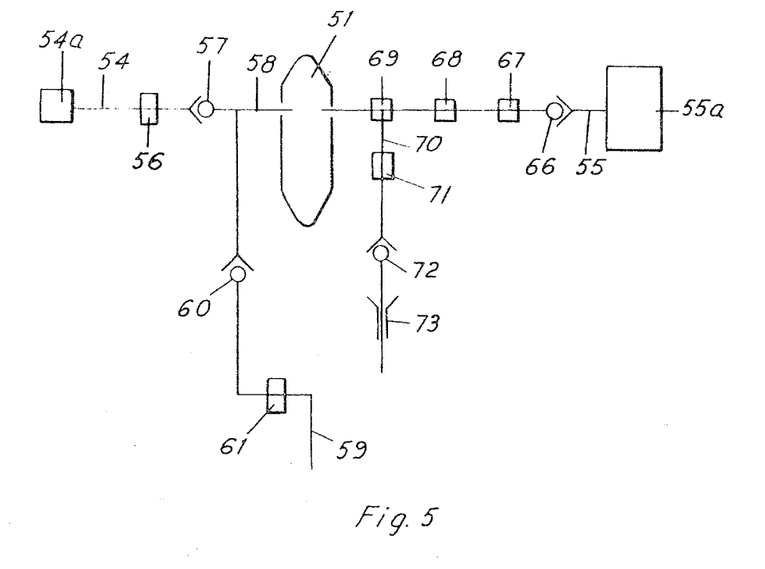
FIG. 5 shows schematically the supply-lines for the beer and for carbon dioxide for pressurizing the pouches, for the apparatus shown in FIG. 4.

In the fully mechanised device illustrated by FIGS. 4 and 5, and referring first to FIG. 4: 31 is a magazine of plastics-film tubular pouches to be filled; 32 is a block, suitably of brass, constituting the pressurizing and filling head, provided with a smooth, flat front surface, 33, in which are the filling orifice, 34, and, concentric with and surrounding the filling orifice, the pressurizing orifice 35; 36, 37 are a pair of blocks, again suitably of brass, separated by a narrow gap, 38, suitably about 0.005 inch wide, and having their smooth, flat front faces level with that of block 32, the face of block 36 being contiguous with that of block 32. Through the gap 38 passes the leading end of a sealing tape, supplied from reel 39, the tape having a heat-sealable coating on the surface that faces the block 36. 40 is the heat-sealing block, whose front face supports a heat-sealer tape, 41. The heat-sealing block 40, which is of heat-insulating material, suitably a bonded fabric laminate, is separated from block 37 by a narrow gap through which operates a retractable knife, 42. 43 is a chute into which filled packs are ejected.

Opposite the members just described are a pair of parallel rails, the upper of which is shown at 44, for supporting inflated packs pressed against them, and a rod, 45, parallel with the rails 44, upon which is driven a reciprocating cylinder, 46; to this cylinder are attached two pairs of vertically-spaced pawls for pushing the pressurized and filled packs to the right (as seen in the FIG. 4), the upper pawls of the two pairs being shown at 47, 48. Also attached to cylinder 46 is a reciprocable vacuum-pad, 49, which may be advanced to take a plastics-film pouch, 50, from the magazine, and transfer it, on movement of the cylinder 46 to the right (as seen in FIG. 4), to a position against the pressurizing and filling block, 32.

The plastics-film pouches, which in this case are closed at their ends by straight gas-tight seals, but are again provided with a circular filling aperture in the wall of each, are accurately located in the magazine with their filling apertures in a predetermined position. Thus, when the apparatus is in operation, successive pouches may be indexed by the vacuum pad 49 to a position in which the filling aperture is opposite and adjacent to the orifices 34, 35 in the pressurizing and filling block 32. When a pouch has been indexed into this position, carbon dioxide is blown through orifice 35 into the pouch, and the vacuum pad is pushed back by the inflating pouch until the pouch comes into contact with the rails 44, while the vacuum is cut off; the cylinder 46 is then returned to its original position, so that the vacuum pad is returned to a position opposite the pouch magazine, and the pawls at 47 are brought past the inflated pack, 51, to its rear side. Meanwhile when the pouch has been inflated to the desired pressure, as shown at 51, a metred quantity of beer is pumped into the pouch through orifice 34, as a jet, carbon dioxide being displaced as the pouch fills. When the flow of beer has stopped and excess has been bled from the feed (as will be later described), the cylinder 46 again advances to the right, and the filled pack 51 is pushed by the pawls at 47 past the sealing tape supply slot and on until its filling aperture is opposite the heat-sealer strip 41, a pack in this position being shown at 52. As the pack advances, the leading end, 53, of the sealing tape is carried forward upon the pack by frictional forces, and further tape is withdrawn from roll 39, until the tape covers and extends beyond the filling aperture. Thus, on arirval at the heat-sealer strip 41, the pack has a patch of sealing tape covering its filling aperture. When this movement of the cylinder 46 is complete, the heat-sealer switches on, the knife 42 advances to cut the tape, and the tape becomes securely sealed as a patch over the filling aperture of the pack. Meanwhile, the cylinder 46 moves back, bringing pawls 48 past the pack shown at 52, to its rear side. At the next forward movement of cylinder 46, the pawls at 48 push the filled and sealed pack from the heat-sealer and on until it drops into chute 43. From the chute 43 the successive packs may pass to a sleeve-wrapping device.

In FIG. 5 are shown schematically the supply lines for the carbon dioxide and beer. As previously indicated, the gas and beer are supplied to the pouches through concentric orifices; for simplification and clarity, however, the two supply systems are shown in FIG. 5 on separate sides of the pack. Both systems provide for any carbon dioxide and beer entering the pouches to be maintained in a substantially sterile condition.

In FIG. 5, 51 represents the pouch being pressurized and filled, 54 the line to the supply source, 54a, of carbon dioxide, which is suitably maintained at a pressure of about 20 p.s.i., and 55 the line to the beer supply, 55a, suitably maintained at a pressure of about 30 p.s.i. For the carbon dioxide line 54, 56 is an on/off valve, 57 a non-return valve, and 58 the line to orifice 35 (FIG. 4); while 59 is a line to drain through non-return valve 60 and pressure-relief valve 61, the latter being set at 20 p.s.i. or other pressure desired in the filled pack. For the beer line 55: 66 is a non-return valve; 67 is a metering pump, suitably a diaphragm pump; 68 is an on/off valve and 69 a 2-way valve; and 70 is a bleed line for beer remaining beyond valve 69 after a pack has been filled, this bleed line leading to a drain via on/off valve 71, non-return valve 72 and restrictor valve 73. In operation, the on/off valve 56 for the carbon dioxide is turned on for the initial inflation of the pouch, and remains on until just before the filled pack is moved from block 32 (FIG. 4) and slid along to be heat-sealed. When the pouch has been pressurized, the measured amount of beer is pumped into it through line 55. As the beer is fed into the pouch carbon dioxide is displaced through non-returned valve 60 and pressure-relief valve 61. When filling is complete, and to prevent beer remaining in th line between valve 69 and the filling orifice from blowing out when the pack is moved, and wetting the surface of block 2 (FIG. 1), 2-way valve 69 is turned to its second position and bleed valve 71 is turned on for a time sufficient to empty this remaining beer to the drain which is at atmospheric pressure, an excessive pressure drop being prevented by restrictor valve 73.

In order to ensure that substantially sterile conditions may be maintained, the parts of lines 58 and 59 between the non-return valves 57 and 60 and the pressurizing orifice, and the part of line 55 between the two-way valve 69 and the filling orifice, are made as short as possible.

Although the apparatus as illustrated in FIGS. 1 and 4 is shown in a vertical position, each apparatus is in fact arranged during operation so that surface 2 or 33, respectively, is in a downwardly facing position, inclined at an angle less than a right angle to the horizontal. The container may then be sufficiently filled with the beer, but a gas space still left under the filling aperture until the aperture has been sealed. The presence of this gas space allows the surface of the container to be kept dry while the container is filled; it also facilitates heat sealing, since the loss of heat through the gas is much less than if a liquid were in contact with the film. When the filling aperture is close to one end of the part of the container that assumes a cylindrical form on inflation, the apparatus is suitably tilted until surface 3 or 33 is at an angle of about 45° to the horizontal; a smaller angle to the horizontal is preferred if the aperture is located further towards the middle of the cylindrical part of the pouch.

Various modifications may be made in the method and apparatus particularly described. For example, other methods may be used for presenting the pouches to the pressurizing and filling surface, or other arrangements may be made for sliding the filled packs from one station to the next. The filled packs may be slid longitudinally or transversely from the filling station to the sealing and ejecting stations, or may be caused to change direction in their progress from one station to another.

The surfaces against which the packs are slid in the apparatus of the invention need not necessarily be flat, provided that they are sufficiently smooth to allow such sliding. They may, for example, form parts of a cylindrical surface. In such modification these surfaces should have a radius of curvature greater than that of the inflated container, so that there is a flattening effect on the wall of the container when pressed against the filling block.

For contents other than carbonated liquids, a gas other than carbon dioxide may be used, particularly nitrogen.

When containers with ligatured ends as previously described are to be used, the method and apparatus of this invention may be adapted to receive the container units in the form of a continuous strip of units joined one to the next, either with the ligatures already applied, or as a strip of flat container units, each sealed at both ends; in the latter case, a ligaturing device is included in the apparatus to apply ligatures to both ends of the container units in advance of their reaching the pressurizing station. It is generally preferred to adopt the latter method, since the strips of flat container units can be more easily reeled and stored than can strips of containers already ligatured.

The nature of the plastics material forming the pouches will be chosen in accordance with the intended pressure to be enclosed or developed within the pack. For high pressures such as those exceeding 15 p.s.i., pouches formed of biaxially oriented polyethylene terephthalate film are especially suitable, particularly when coated with a heat-sealable, gas-impermeable coatings, for example a coating of vinylidene chloride copolymer. The coating may be an external coating or an internal coating.

The adhesive used for sealing the filling aperture must also be chosen to suit the pressure it will have to withstand. Hot melt adhesives, particularly when used on a plastic film of the same type as used for the construction of the container, are generally preferred. Particularly suitable hot melt adhesives include those based on copolymers of two or all of the acids sebacic, terephthalic and isophthalic acid condensed with ethylene glycol. Hot melt adhesives based on ethylene/vinyl acetate copolymers are also suitable. When a hot-melt adhesive is used, it is essential for the seal to be cool before the internal pressure acts upon it. The seal may be heated and cooled with the pack stationary, using an impulse heat-sealing device, or the pack may be moved successively over a heated zone in the position of the patch, followed by a cooling zone. It is however within the scope of our invention to use a sealing strip bearing a pressure sensitive adhesive coating.

The filled packs are preferably provided with a sleeve of paper, foil or other flexible sheet material, preferably formed by wrapping or winding around substantially the whole of the cylindrical part of the pack a sheet or strip of the sheet material and securing it by means of an adhesive, such as a moisture-activated adhesive, applied at least to the edges of the sheet. If the sleeve is applied closely to the container while the contents are cold, subsequent slight expansion of the container results in the container walls being firmly supported by the sleeve. This gives added strength to the pack and also provides for its labelling and decoration. The sleeve, may in suitable cases be extended at one end to form a stand.

A further advantage of the packaging method of this invention over the conventional methods of bottling and canning carbonated drinks, particularly beer, is that the liquid need never come significantly into contact with oxygen after it leaves the reservoir, until the package is opened. The flavour of the beer may thus be excellently preserved. Another advantage is that there need be no spillage.

Our invention is further illustrated but in no way limited by the following example.

EXAMPLE

A container formed from a 9-inch length of biaxially oriented lay-flat tubing of polyethylene terephthalate, having a wall thickness of 0.0008 inch and a flat width of 2.5 inches (1.75 inches diameter when inflated at 15 p.s.i. (gauge) pressure), having a 0.00015 inch thick external coating of vinylidene chloride copolymer, and closed at both ends by the ligature/thickened seal method referred to hereinbefore, was filled with beer by the following method.

A circular aperture 0.22 inch in diameter was punched in the wall of the container, 2.5 inches from the top closure, and the container was placed in a filling device as described hereinbefore with reference to FIGS. 1 to 3 of the drawings, with the aperture located over the carbon dioxide and beer inlet orifices. The beer supply was at a temperature of 70° F. and under a carbon dioxide pressure of 18 p.s.i. and was located at a height of 4 ft. above the filling device. The stop setting the gap between the sliding plate and the main part of the apparatus was set to provide a gap of 1.25 inches between the plate and the flat surfaces of the filling block and heat sealing unit. The apparatus was tilted so that the longitudinal axis of the container was at an angle of 20° to the horizontal, with the aperture located uppermost and at the top end of the container. The container was first pressurised with the carbon dioxide and then filled with beer in the manner described hereinbefore. After the filling probe had been withdrawn, the sliding plate was moved downwards with the filled container and sealing strip, the surface of the container sliding upon the filling block, until the aperture was opposite the centre of the heat-sealing element. An impulse of 10 volts for 20 secs. was then passed through the sealing element, which was a 4.125 x 0.875 x 0.0005 inch stainless steel strip. The seal was allowed to cool, and the filled, sealed container was withdrawn from the apparatus; the sealing strip was then trimmed off at each side of the seal. A length of the same sealing strip was heat-sealed horizontally around the container, over the sealed aperture.

The sealing strip used was a strip of biaxially oriented film of polyethylene terephthalate, bearing a heat-seal coating of 50 parts of ethylene/vinyl acetate copolymer (24% vinyl acetate) and 50 parts of polyterpene resin.

The filled pack was held at 70° F. for 2 days, then at 40° F. for 3 days, and finally at 80° F. for 2 days. At the end of this time the seal was intact, and the contents when tested were indistinguishable from the same beer bottled at the same time in the conventional manner.

The method of this example may readily be adapted to the operation of the mechanised apparatus described hereinbefore with reference to FIGS. 4 and 5 of the accompanying drawings.

We claim:

1. A method of filling and sealing a flexible plastics container, closed by gas-tight seals except at a filling aperture in its wall, to produce a package having contents at superatmospheric pressure, which comprises: placing the container against a smooth surface with said aperture located over an orifice in said surface, said orifice being connected to a source of gas at superatmospheric pressure and said surface being of such smoothness that the aperture may be sealed thereby against the substantial escape of gas when the container is inflated and held with its apertured wall pressed against said surface; inflating the container by the introduction of gas through said orifice from said source of gas; and while holding the inflated container with said aperture in substantially gas-tight juxtaposition to said surface, sliding the container along, against and relative to said surface, to bring that portion of the wall of the container which surrounds said aperture into contact with a supported flexible sealing strip held in substantially continuous relationship to said surface; and sealing the sealing strip to the wall of the container around said aperture, while said container is substantially in gas-tight juxtaposition to said surface.

2. A method as claimed in claim 1 in which, after the container has been inflated by said gas, but before it is sealed, introducing into said container a liquid or particulate solid supplied under pressure such that the major part of the gas is displaced by said liquid or particulate solid while concurrently withdrawing from said container said displaced gas.

3. A method as claimed in claim 2, in which the container is inclined with its longer axis at an angle less than a right angle to the horizontal, with the filling aperture on its upper most side, for the filling and sealing operations.

4. A method as claimed in claim 2 in which the container is inflated through a first orifice in said surface, the inflated container is slid along said surface to bring its aperture over a second orifice in said surface, a liquid or particulate solid is supplied through the second orifice into the container, and the container is further slid along said surface to bring that portion of its wall which surrounds said aperture into contact with the sealing strip.

5. A method as claimed in claim 2 in which the container is filled with a carbonate liquid.

6. A method as claimed in claim 5 in which the carbonated liquid is beer.

7. Apparatus for filling and sealing a flexible plastics container, said apparatus comprising a smooth surface having therein an orifice; means for supplying and supporting a sealing strip in such manner that it may be drawn from its source of supply along a path substantially continuous with said surface and in line with but in a direction away from said orifice; means for supplying through said orifice a gas for inflating to superatmospheric pressure a plastics-film container presented to said surface with a filling aperture in its wall located over said orifice; and a support means for holding the container sufficiently under compression against said surface to maintain a substantially gas-tight seal around said aperture while the container is slid along said surface to bring said aperture into the path of said sealing strip, and until the sealing strip covers and surrounds said aperture.

8. Apparatus as claimed in claim 7 which includes a heat-sealer for sealing said sealing strip around said aperture.

9. Apparatus as claimed in claim 7 which includes a second orifice in said smooth surface, closely associated with the first said orifice, and means for supplying through said second orifice a liquid or particulate solid to be filled into the container.

10. Apparatus as claimed in claim 9 which includes a second orifice in said smooth surface, spaced between the first said orifice and the path of the sealing strip, and connected to a source of liquid or solid to be filled into the container.

11. Apparatus as claimed in claim 9 which includes a hollow probe connected to a source of liquid or particulate solid under pressure, and adapted to be advanced and withdrawn through said second filling orifice in said surface, and, when in the advanced position, to feed a liquid or particulate solid into an inflated container which has its filling aperture located over said filling orifice.

References Cited
UNITED STATES PATENTS

| | | | |
|---|---|---|---|
| 3,245,200 | 4/1966 | Shaw | 141—329 X |
| 3,590,888 | 7/1971 | Coleman | 141—48 X |
| 2,649,234 | 8/1953 | Taunton | 206—Dig. 12 |
| 2,606,704 | 8/1952 | Nichols | 206—Dig. 12 |
| 2,576,322 | 11/1951 | Waters | 206—Dig. 12 |
| 2,875,070 | 2/1959 | Rockland et al. | 99—171 R |

FRANK W. LUTTER, Primary Examiner

S. L. WEINSTEIN, Assistant Examiner

U.S. Cl. X.R.

53—22 B, 112 B; 99—171 S, 189; 141—48, 290

UNITED STATES PATENT OFFICE
CERTIFICATE OF CORRECTION

Patent No. 3,745,024          Dated July 10, 1973

Inventor(s) ANDREW GEORGE FORD ET AL.

It is certified that error appears in the above-identified patent and that said Letters Patent are hereby corrected as shown below:

Claim 2, line 1, delete "in which" and substitute therefor --that includes the step of--.

Claim 3, line 4, change "upper most" to -- uppermost --.

Claim 5, line 2, change "carbonate" to -- carbonated --.

Signed and sealed this 2nd day of April 1974.

(SEAL)
Attest:

EDWARD M.FLETCHER,JR.
Attesting Officer

C. MARSHALL DANN
Commissioner of Patents